United States Patent [19]

New et al.

[11] Patent Number: 5,556,151
[45] Date of Patent: Sep. 17, 1996

[54] TAILGATE RULER AND FIXTURING DEVICE

[76] Inventors: Daniel D. New; William G. New, both of P.O. Box 881-170, Conroe, Tex. 77301

[21] Appl. No.: 460,849

[22] Filed: Jun. 5, 1995

Related U.S. Application Data

[63] Continuation of Ser. No. 240,325, May 10, 1994, abandoned.

[51] Int. Cl.$^6$ ................................................. B60R 13/01
[52] U.S. Cl. ..................... 296/39.2; 296/51; 269/289 R; 269/902
[58] Field of Search ................... 296/26, 37.6, 39.1, 296/39.2, 50, 51, 57.1; 83/471.2, 471.3, 477.2, 581, 928; 269/289 R, 296, 902; 224/42.42

[56] References Cited

U.S. PATENT DOCUMENTS

| | | | |
|---|---|---|---|
| 3,628,578 | 12/1971 | Berg | 143/6 A |
| 4,279,439 | 7/1981 | Cantieri | 296/39 R |
| 4,333,678 | 6/1982 | Munoz | 296/39 R |
| 4,592,583 | 6/1986 | Dresen | 296/39 R |
| 4,707,016 | 11/1987 | McDonald | 296/39 R |
| 4,733,898 | 3/1983 | Williams | 296/24 R |
| 4,890,874 | 1/1990 | Davis | 296/39.2 |
| 4,900,217 | 2/1990 | Nelson | 414/537 |
| 4,936,625 | 6/1993 | Pickard et al. | 296/39.2 |
| 5,000,503 | 3/1991 | Bernatek | 296/39.2 |
| 5,007,568 | 4/1991 | Da Vault | 224/42.45 R |
| 5,046,775 | 9/1991 | Marcum | 296/39.2 |
| 5,116,096 | 5/1992 | Taylor | 296/3 |
| 5,169,201 | 12/1992 | Gower . | |
| 5,207,472 | 5/1993 | Gower | 296/39.2 |

*Primary Examiner*—Dean Kramer
*Attorney, Agent, or Firm*—John Moetteli

[57] ABSTRACT

A fixturing device/scale combination that is permanently located at a place where it is likely to be used and which is attached to the pickup or trailer such that it will be transported to the work site without necessitating any additional thought or planning by the handyman or carpenter. The invention may be attached to the tailgate of a pickup truck or to other various work surfaces, including utility beds, and trailers in order to facilitate measuring lengths and angles for cutting lumber and other materials.

4 Claims, 3 Drawing Sheets

TAILGATE RULER AND FIXTURING DEVICE

This is a continuation application of an application of the same name, Ser. No. 08/240,325 filed May 10, 1994, now abandoned.

TECHNICAL FIELD

This invention relates generally to fixturing devices used to restrain and orient a piece of lumber while sawing it to length or to mark it for future cutting. To aid in this function, the invention includes a measuring aid with demarcations and reference points such that it functions as a miter and scale as well. In addition, the invention is mountable on a truck or trailer tailgate such that it is either an integral part of the tailgate or is attached to the tailgate in a manner similar to a tailgate bedliner or tailgate protector.

BACKGROUND OF THE INVENTION

For as long as trailers and pickup trucks have existed, there has been some sort of tailgate which is more or less permanently affixed to the trailer or pickup bed. In recent years it has become popular to purchase a bedliner which usually includes a tailgate protection portion. This bedliner has the purpose of protecting the sidewalls of the pickup or trailer bed from dings and dents which are caused when a sharp corner or blunt edge of the cargo collides with the sidewall or tailgate. This bedliner in turn protects the cargo from reciprocal damage by the side-walls and has certain aesthetic appeal to the user as well.

Since time immemorial there has been a need in the carpentry trade for a means of fixturing lumber or other construction materials so that it can be conveniently or accurately cut to length. As anyone who has attempted to cut lumber using his body weight and kneecap will attest, lumber tends to slip and slide in the direction of the cut if not properly restrained during the sawing operation. Using the kneecap approach, an inaccurate, unattractive and possible unsatisfactory cut is likely to result together with a scrape or bruise on the knee. This approach often requires awkward balancing or an additional person to hold material. Of course, this could have been avoided if the lumber were properly fixtured in some sort of restraint means. Commonly, a bench vice is employed for this purpose, particularly when the lumber is to be cut using a handsaw. However, a bench vice tends to be bulky, heavy and cumbersome to relocate. Therefore it is usually more or less permanently affixed to a work bench at the carpenter's shop or work shed. This means that it will not be available at the remote work site unless extra efforts are taken to relocate the vice from the shop workbench to some other worktable at the work site. Fixturing devices are available which are considered more or less portable. An example of such a fixturing device is the Black & Decker "WORKMATE", a collapsible worktable that has built-in fixturing jaws. Although the "WORKMATE" is more or less portable, its design is not conducive to permanent attachment to a tailgate thereby necessitating advance planning should it be required at a particular remote location. In addition, it's usefulness for its purpose depends largely on whether or not a flat, level and relatively immobile floor is available at the remote location. Such a floor is not always available at a remote work site.

For as long as carpenters and home handy-men have been around, they have been misplacing their measuring devices, whether they be tape measures, rulers or yardsticks. Professionals are more likely to keep their measuring devices handy—home handymen are less likely to do so. If a measuring device is not readily available or has been temporarily misplaced, both tradesmen and the handymen are likely to buy a new one rather than delay their project until the previously purchased scale is discovered. Eventually, they will have learned to keep the scale in a predictable location or will have purchased enough so that they are likely to find one when necessary—this may however necessitate the purchase of several measuring devices thereby the incurring unnecessary costs.

Since trailers and pickups are mobile and jigs, vices and fixtures which are usually used in the carpentry trade or for do-it-yourself uses are often bulky and relatively immobile, it is apparent that the situation will arise where the carpenter or home-handyman will be away from his shop equipment, in the remote location to which he is hauling lumber or some other construction material which will ultimately require measuring, marking, cutting or sawing.

A need therefore exists for a fixturing device/miter/scale combination that is permanently located at a place where it is likely to be used and which is attached to the pickup or trailer such that it will be transported to the work site without necessitating any additional thought or planning by the handyman or carpenter.

SUMMARY OF THE INVENTION

The invention is attached to the tailgate of a pickup truck or to other various work surfaces, including utility beds, and trailers in order to facilitate measuring lengths and angles for cutting lumber and other materials. By synergistically combining the present invention with that of a tailgate liner/protector whose purpose is to prevent or minimize damage to cargo and to the tailgate when cargo moves or slides back and forth in the bed during transit, weight and compactness is gained without any reduction in functionality of the invention for its various uses.

By virtue of its being affixed to the tailgate or other surface on the vehicle, the present invention is automatically transported to the work site along with the trailer or truck, making it readily available for use by the tradesman or handyman whenever he finds a need. Because the tradesman is often faced with an unexpected or spontaneous need to fixture materials, giving him the ability to fixture and cut on demand will increase his productivity and therefore his profits.

This secondary function as a tailgate protector ensures not only that the invention will be available for use at all times but that it will be serving a beneficial function whenever the user is transporting materials, whether he expects to cut these materials or not. This is important because, although the invention may be made of a lightweight plastic or rubber, any deviations from the normally flat inside surface of the tailgate will require more material. More material means an increase in weight, albeit a minimal increase. However, any increase in weight tends to decrease fuel consumption (all else being equal). Therefore, the constant benefit gained from the invention's use as a tailgate protector serves to justify the added weight of the structure.

Because a truck or trailer tailgate is generally a natural work surface, one which is secure, ideally positioned with respect to the material being transported and readily available for use by virtue of the fact that it is an integral part of the trailer or truck, the benefits of the present invention are apparent. The present invention provides a fixturing device at a place of ultimate convenience for the user, one that will enable him to fixture, mark and cut the material at the remote site without the need to plan ahead.

It should be also noted that the present invention eliminates the disadvantages of a tape measure in that the demarcations may be permanently made on a long, straight structure which is affixed to the tailgate, thereby eliminating the usual disadvantages of a tape measure (e.g. fixturing, tendency to recoil or bow, breaking when dropped or recoiling too rapidly), characteristics which sometimes make measurement unwieldy.

The present invention eliminates the need for clamps or other fastening devices by providing a single or multi-stepped channel into which standard width lumber may be restrained during sawing and/or marking. One embodiment, a multi-stepped design, provides pre-set channel widths thereby eliminating the need to separately or individually adjust the width of the channel as in a vice in order to restrain the lumber or other standard-width material to be cut. Another embodiment incorporates a V-groove channel for the purpose of facilitating the restraint of pipe or solid round stock of any material so that cylindrical shapes may be cut or marked as well. This V-groove channel is best positioned parallel to the scalar demarcations of the ruler portion of the invention and within the stair-stepped channel mentioned above.

The present invention further contemplates use of a protractor attachment permanently or releasably affixed to the restraint channel with the purpose of providing a convenient means of marking angled cuts on the material so affixed. In addition, miter slots may be provided at set angular relationships with respect to the axis of a material restraint channel. This will facilitate the restraint of a hand saw blade within a single plane of motion for cutting material at a particular angle with respect to the axis of the channel. The miter slots may be formed from metal bodies which are attached with respect to the restraint channel such that they may be replaced in case of wear resulting from contact with a hardened saw blade.

The invention also contemplates use on other work surfaces such as trailer beds, tool boxes, utility beds, or craftsmans' worktables.

Other objects and advantages of this invention will become readily apparent as the same is better understood by reference to the following detailed description, appended claims and the accompanying drawings, a brief description of which follows.

DETAILED DESCRIPTION

Figure 1:
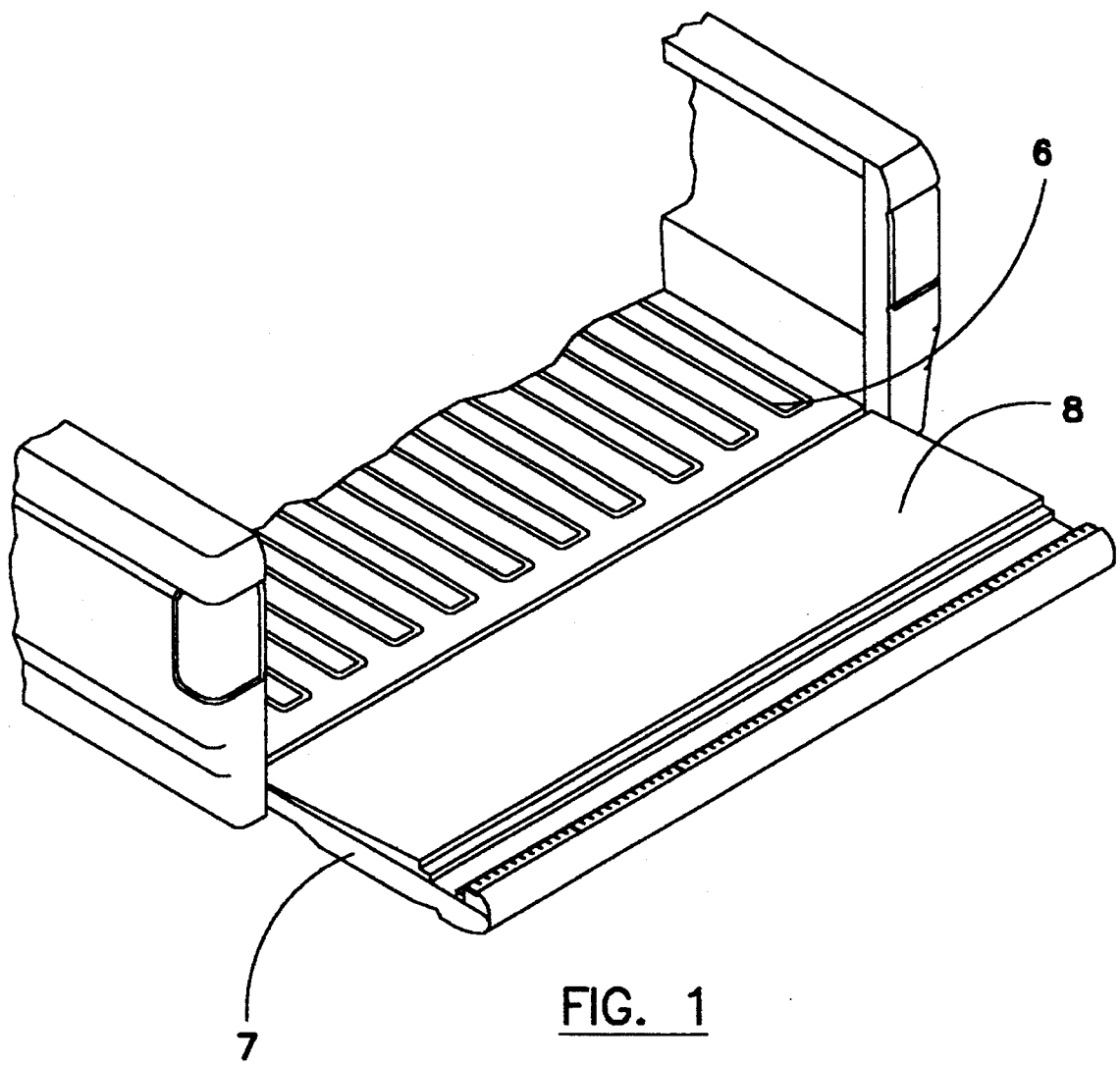
FIG. 1 is a view in perspective showing the rear partial view of a pickup bed with its tailgate lowered such that the operative portions of a first embodiment of the present invention are visible.

Referring now to the drawings wherein is shown a preferred embodiment and an alternative embodiment wherein like reference numerals designate like elements throughout the several views, there is shown in FIG. 1 a vehicle such as a pickup truck having a bed 6 and tailgate 7. Further it can be seen that the tailgate forms a work surface 8 upon which various items or materials can be placed so as to facilitate handling during a variety of cutting and fabrication operations.

Figure 2:
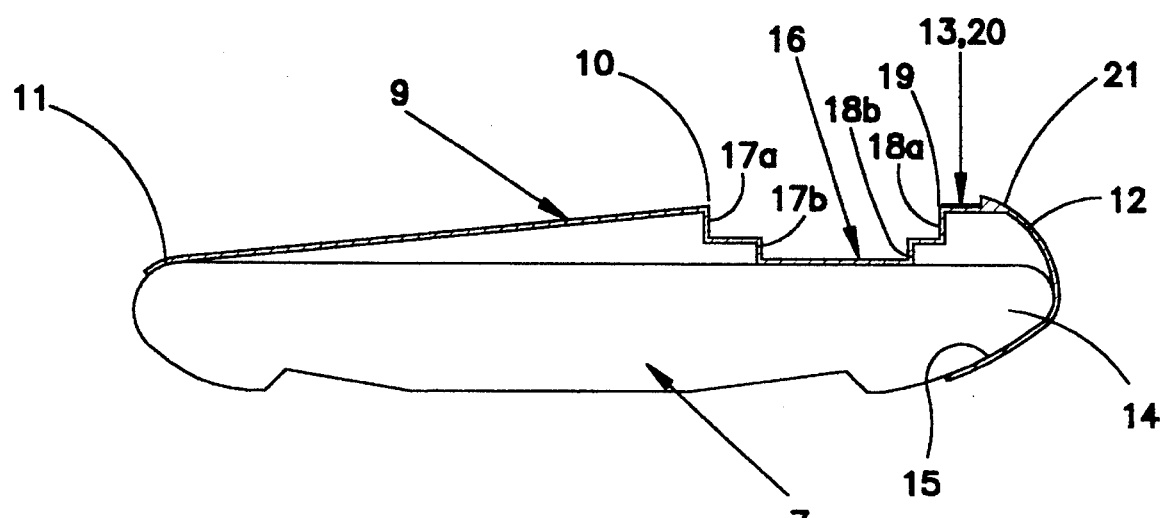
FIG. 2 is a cross section view of the tailgate and cover assembly of a first embodiment of the present invention mounted onto a tailgate.

In accordance with the first embodiment of the present invention as illustrated in FIGS. 1 and 2, the invention is made such that it covers the bulk of the inside surface of the tailgate 8 so as to protect the inside surface of the tailgate from scratches, dings or dents which might occur as a result of the abutment of cargo against the tailgate. This positioning also facilitates the use of the invention to protect the cargo itself from dings and scratches that might otherwise be caused by abutment with an uncovered tailgate. Lower flange 9 extends from the lower lip 10 of the upper channel to the lower inside tailgate face 11. The upper flange 12 extends from the measuring channel 13 across the crown 14 of the tailgate to the backside of the tailgate 15, thereby functioning as a decorative protector such that the crown of the tailgate is protected from nicks and scratches that may be caused from oversize lumber and other items which may overhang the tailgate crown 14 during transit. In between said upper and lower flanges, 9 and 12, lies the channel portion having the capability to restrain at least one width of material in said channel 16. The sidewalls 17a, 17b, 18a, and 18b of the channel portion are stair-stepped such that the distance between steps 18a or 18b and corresponding opposite sidewalls 17a and 17b relates to a predetermined width of material, most advantageously being a standard width of lumber. Along either the lower or upper lips 10 and 19 is installed or molded-in scalar demarcations 20. These demarcations can either be integral to the body 21 of the invention or fastened thereto utilizing a conventional fastening means such as adhesives or rivets.

Figure 3:
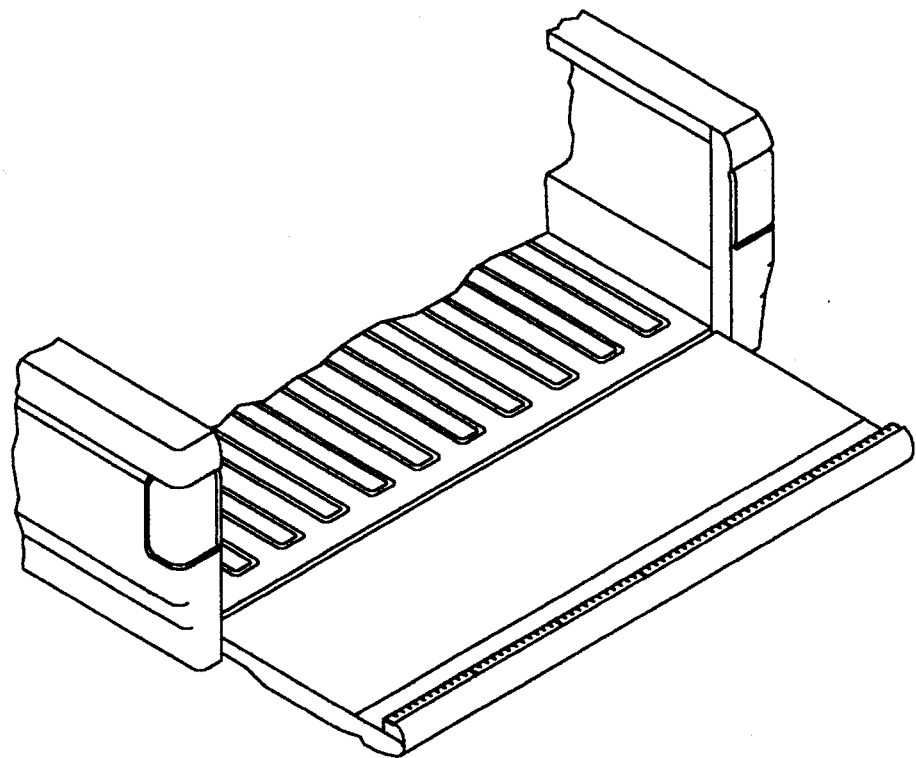
FIG. 3 is a view in perspective showing the rear partial view of a pickup bed with its tailgate lowered such that the operative portions of a second embodiment of the present invention are visible.
Figure 4:
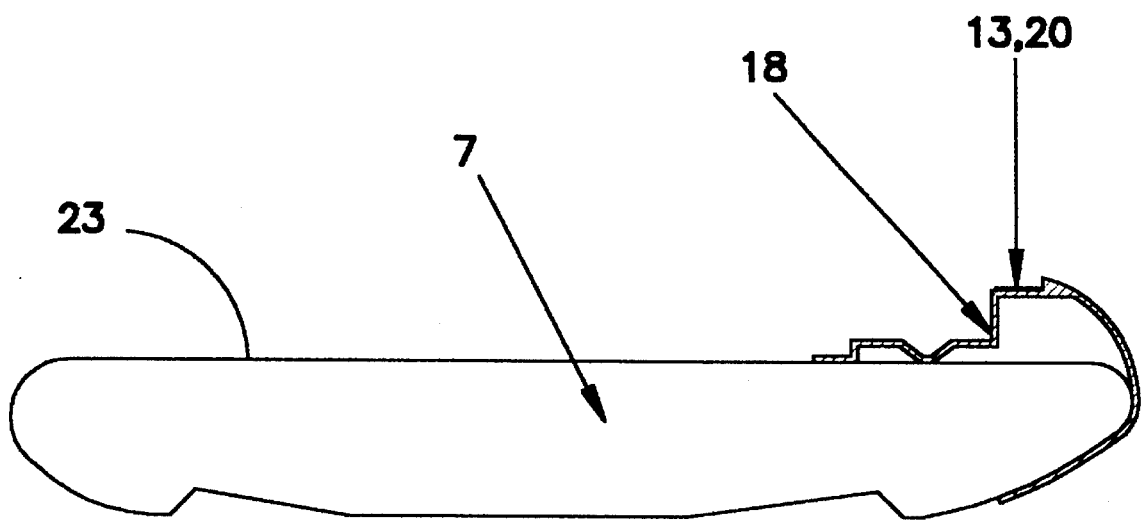
FIG. 4 is a cross section view of the tailgate and cover assembly of the second embodiment of the present invention mounted onto a tailgate.

In accordance with a second embodiment of the present invention as illustrated in FIGS. 3 and 4, the invention is made such that it is attached to the inside surface 23 of the tailgate 8 and the crown 4 of the tailgate 8 so as to function as a tailgate protector. Only one sidewall 18, against which lumber and other work materials may abut, is provided. This second embodiment is not the most preferred as it does not fixture the work material in place as securely as the first embodiment described above. However, it has the advantage of simplicity and the ability to accommodate work materials of a wider variety of widths. In addition, a V-Groove 25 may be provided to better fixture round objects.

In accordance with another aspect of the present invention, the invention is made such that it is attached to the inside surface of the tailgate 8 or any other suitable work surface utilizing conventional fastening means via the upper flange 12 and lower flange 9, without regard to whether the surface of said work surface is protected from minor dents and dings.

In accordance with another aspect of the present invention, the invention is made integral with the structure of the tailgate 8 such that the outermost surface of the tailgate 8 are flanges 9 and 12.

It should be understood that the foregoing disclosure relates to only preferred embodiments of the invention and that it is intended to cover all changes and modifications of the example of the invention herein chosen for the purposes of the disclosure which do not constitute departures from the spirit and scope of the invention as set forth in the claims.

I claim:

1. A tailgate protector comprising:

a body which is attached to a tailgate in such a manner as to protect a portion of the inside surface and crown of said tailgate from damage from cargo, said body including scalar demarcations along its length;

a V-groove for the purpose of restraining cylindrical materials, said V-groove being formed parallel to said demarcations along said body;

fixturing means wherein lumber and other building materials may be restrained; and fastening means whereby said body may be fastened to said tailgate.

2. A tailgate protector comprising:

a body which is attached to a tailgate in such a manner as to proctect said tailgate from damage from cargo, said body including scalar demarcation along its length;

a channel formed within said body; said channel comprising a least one pair of opposite sidewalls having a separation distance corresponding to the width of material which is to be secured between said sidewalls;

upper and lower flanges extending from said channel which cover portions of the exposed surfaces of said tailgate; and fastening means whereby said body may be fasted to the tailgate.

3. A material fixturing device comprising:

a body, said body including scalar demarcations along its length and a channel formed within said body; said channel comprising at least one pair of opposite sidewalls having a separation distance corresponding to the width of material which is to be secured between said sidewalls;

fixturing means wherein lumber and Other building materials may be restrained; and fastening means whereby said body may be fastened to a structure on a mobile container;

the material fixturing device being integrally formed on the inside surface of the tailgate of said mobile container, said inside surface facing the interior of the cargo storage area of said mobile container when in the closed position.

4. A material fixturing device comprising:

a body, said body including scalar demarcations along its length and a channel formed within said body;

said channel comprising at least one pair of opposite sidewalls having a separation distance corresponding to the width of material which is to be secured between said sidewalls;

a lip formed along said body; said lip extending in a dimension parallel with said demarcations and defining a profile against which material may be aligned;

fixturing means wherein lumber and other building materials may be restrained; and fastening means whereby said body may be fastened to a structure on a mobile container;

the material fixturing device being integrally formed on the inside surface of the tailgate of said mobile container, said inside surface facing the interior of the cargo storage area of said mobile container when in the closed position.

* * * * *